United States Patent [19]
Braun et al.

[11] Patent Number: 5,579,896
[45] Date of Patent: Dec. 3, 1996

[54] SYSTEM FOR ARRESTING SCRAPER-CONVEYOR CHAIN

[75] Inventors: Ernst Braun; Gert Braun, both of Essen, Germany

[73] Assignee: DBT Deutsche Bergbau-Technik GmbH, Wuppertal, Germany

[21] Appl. No.: 403,004

[22] Filed: Mar. 10, 1995

[30] Foreign Application Priority Data

Mar. 30, 1994 [DE] Germany ..................... 94 05 389.8 U

[51] Int. Cl.$^6$ ..................................... B65G 19/00
[52] U.S. Cl. ...................... 198/728; 198/735.1; 198/813; 198/866
[58] Field of Search ..................... 198/717, 719, 198/728, 731, 733, 735.1, 813, 866

[56] References Cited

PUBLICATIONS

Halbach & Braun Maschinenfabrik GmbH & Co.; "3–teiligen Kettenfestsetzeinrichtung"; 1 page. (No Date).
Halbach & Brau; "'3–teilige Kettenfestsetzeinrichtung"; 1 page (No Date).

Primary Examiner—D. Glenn Dayoan
Attorney, Agent, or Firm—Herbert Dubno; Andrew Wilford

[57] ABSTRACT

A scraper conveyor has a channel having a pair of parallel and longitudinally extending upstanding sides and a chain extending longitudinally along the channel between the sides thereof and normally advanced therein in a travel direction. A chain-arresting system has a crosspiece fixable to the chain and having outer ends juxtaposed with the channel sides and each of a predetermined length measured in the direction. Respective blocks fittable with the sides of the channel are each formed with an inwardly open inner groove into which the respective end of the crosspiece can engage. An abutment in the groove has a rear face directed backward against the direction and engageable with the respective crosspiece end and an inner hole spaced in the direction rearward of the abutment face by a distance greater than the crosspiece-end length. Respective pins engageable through the inner holes behind the respective crosspiece ends trap same in the respective blocks.

6 Claims, 2 Drawing Sheets

SYSTEM FOR ARRESTING SCRAPER-CONVEYOR CHAIN

FIELD OF THE INVENTION

The present invention relates to a scraper-type conveyor. More particularly this invention concerns a system for arresting the chain of such a conveyor.

BACKGROUND OF THE INVENTION

A scraper conveyor is used, for instance, in a long-wall mining operation to convey ore or coal. It comprises an upwardly open channel that normally extends horizontally parallel to the face so that a coal plow or the like can cut ore or coal from the face and deposit it in the channel. A stretch of a massive chain extends along the channel and has a succession of flights that extend transverse to the chain between the raised sides of the channel to push along the material therein.

The conveyor chain is subjected to enormous tension so that it inevitably stretches and must therefore be tightened. It is therefore standard practice to arrest the chain in the conveyor by fixing to each side of the conveyor an anchor shoe or block, securing a so-called bridge or crosspiece to a horizontal link of the chain, and then fixing the ends of the crosspiece to these blocks so that tension can be applied to the chain which is locally locked in the conveyor channel. To this end the channel sides have vertically throughgoing bores and the anchor shoes are each formed with an outer groove that fits with the upper edge of the respective side and with a vertical hole that can be aligned with the hole of the side to allow a pin to be dropped into place to fix the shoe to the respective side. Each shoe is further formed with an inwardly directed inner groove into which the respective end of the crosspiece can engage. Another vertical bore in the shoe traverses this inner groove and the ends of the crosspiece are formed with vertically throughgoing holes so that when aligned another pin can be dropped into place to fix each crosspiece end in the respective shoe.

The disadvantage of this system is that it is necessary to align the holes of the crosspieces perfectly with the inner holes of the respective shoes. Doing this is quite difficult as it is hard to move the massive chain in tiny increments accurately in order to get the necessary alignment. Thus there is normally a certain amount of forward and reverse movement until the crosspiece can be locked into the anchor shoes.

OBJECTS OF THE INVENTION

It is therefore an object of the present invention to provide an improved system for arresting crosspieces of a scraper-type conveyor.

Another object is the provision of such an improved system for arresting crosspieces of a scraper-type conveyor which overcomes the above-given disadvantages, that is which makes it easy to block the crosspiece ends.

SUMMARY OF THE INVENTION

A scraper conveyor has a channel having a pair of parallel and longitudinally extending upstanding sides and a chain extending longitudinally along the channel between the sides thereof and normally advanced therein in a travel direction. A chain-arresting system has according to the invention a crosspiece fixable to the chain and having outer ends juxtaposed with the channel sides and each of a predetermined length measured in the direction. Respective blocks fittable with the sides of the channel are each formed with an inwardly open inner groove into which the respective end of the crosspiece can engage. An abutment in the groove has a rear face directed backward against the direction and engageable with the respective crosspiece end and an inner hole spaced in the direction rearward of the abutment face by a distance greater than the crosspiece-end length. Respective pins engageable through the inner holes behind the respective crosspiece ends trap same in the respective blocks.

Thus with this system there is no need to painstakingly displace the massive drive chain back and forth to align holes in the crosspiece with the holes in the anchor blocks. Instead, the blocks are set and the chain is advanced until the crosspiece ends come solidly against the abutments of the anchor blocks, whereupon the pins are dropped into place behind the crosspiece ends, trapping them in the blocks.

The inner hole according to the invention traverses the inner groove and each crosspiece end is formed with a rearwardly directed notch that engages around the respective inner pin. Thus when the pins are in place the crosspiece ends are very solidly trapped.

The crosspiece ends in accordance with this invention are each of generally trapezoidal section and the inner grooves are complementarily shaped. Furthermore, the channel sides are formed with vertical channel holes and the blocks are formed with respective outer holes alignable with the channel holes. The system further has according to the invention outer bolts engageable through the outer holes and channel holes for fixing the blocks on the channel sides. Each channel side has an inwardly projecting lip and each block is formed with an outer groove engageable over the respective lip.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
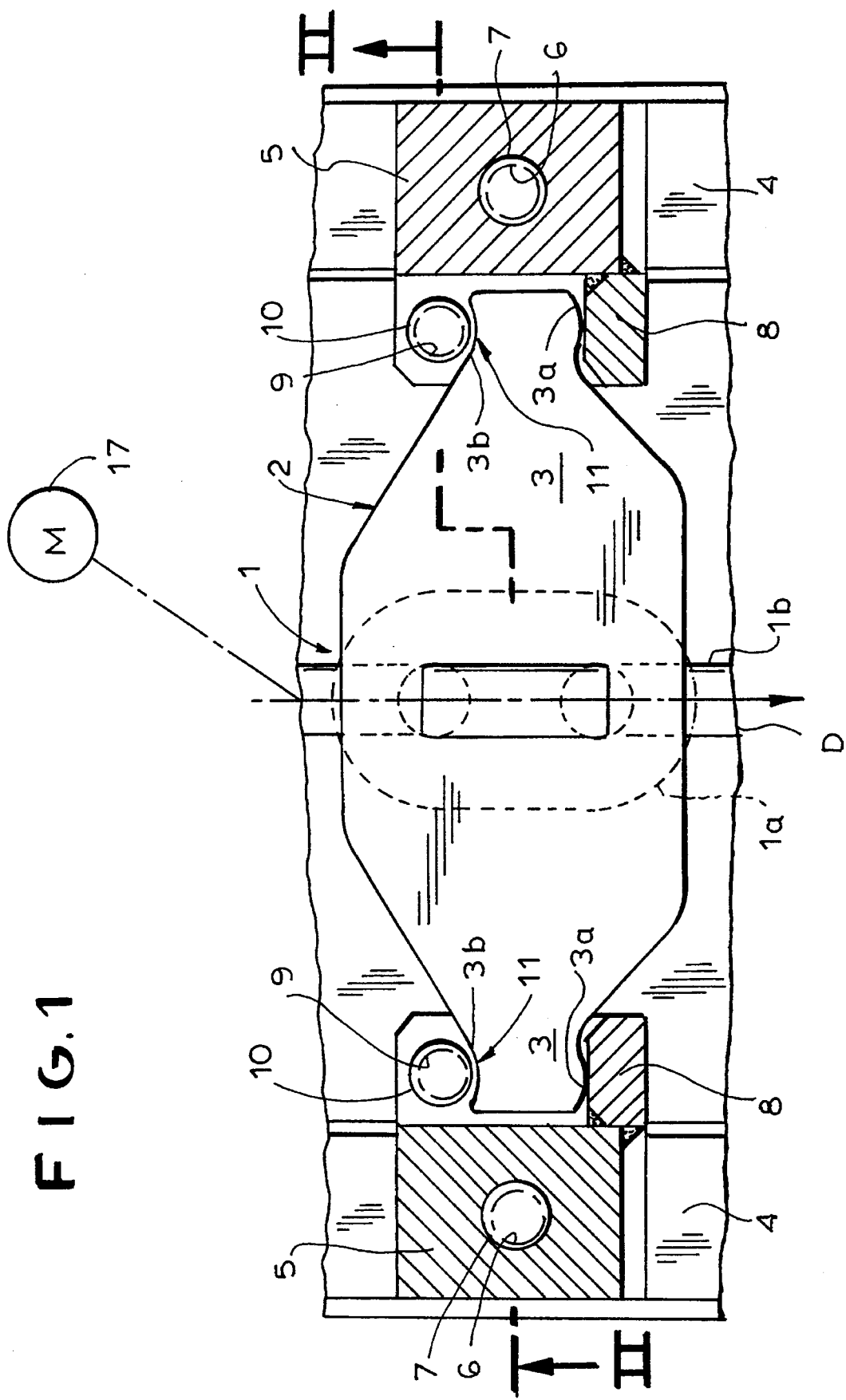
FIG. 1 is a partly sectional top view of the system of this invention.
Figure 2:
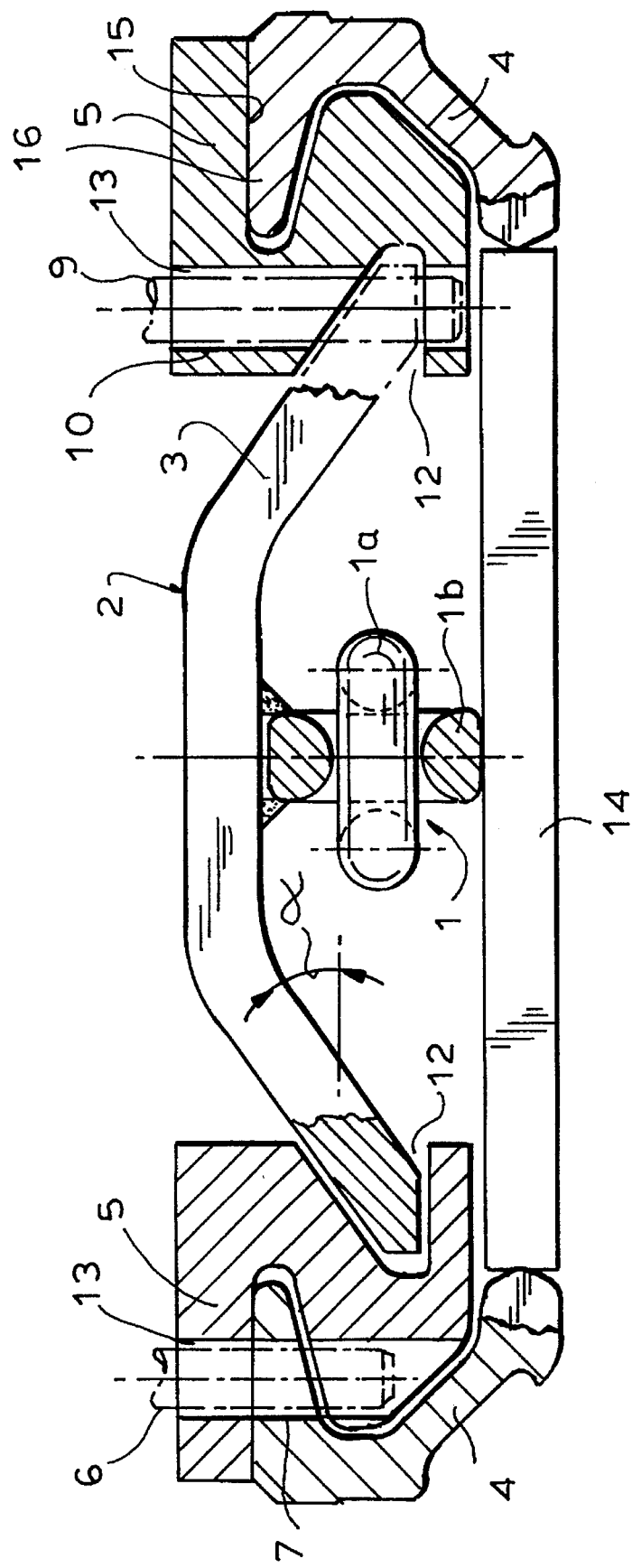
FIG. 2 is a vertical section taken along line II—II of FIG. 1.

As seen in the drawing a conveyor drive chain 1 having horizontal round links 1a and vertical round links 1b extends along a conveyor having a pair of sides 4 and a floor 14. The chain 1 is normally displaced in a direction D by a drive illustrated schematically at 17 and can be locked in place by means of a crosspiece 2 and a pair of anchor blocks 5.

Each anchor block 5 is formed of a single cast piece of metal with an outwardly directed groove 15 that is complementary with and that fits with an inwardly directed ridge 16 of the respective side. The block 5 is formed with an outer vertical hole 13 and the side 4 with an identical hole 7 so that a pin 6 can be dropped through the aligned holes 13 and 7 to lock the respective block 5 on the conveyor side 4. In addition the block is formed with an inwardly open groove 12 of right-trapezoidal section and is provided relative to a normal direction of travel D of the chain 1 with an abutment 8 and, at some spacing behind this abutment 8, with a vertically throughgoing hole 10 like the hole 13.

The crosspiece 2 is generally trapezoidal and is formed of a massive steel casting. It has ends 3 of a shape complementary to that of the groove 12 and having relative to the direction D a forwardly convex front surface 8 and a rearwardly concave back surface 3b formed with a cutout or recess 11. The ends 3 extend downward at an angle α of about 45° from the straight center portion of the bridge or crosspiece 2.

To arrest the chain 1 two blocks 5 are fixed directly across from each other by means of the pins 6 so that they are solidly mounted on the conveyor sides 4. A crosspiece 2 is fitted to a horizontal link 1a at a location somewhat upstream in the direction D from the anchor blocks 5. The drive 17 for the chain 1 is started until the front surfaces 3a of the ends 3 engage the abutments 8, whereupon the drive 17 is stopped. Pins 9 are then dropped into the holes 10 behind the ends 3, fitting in the rearwardly concave notches 11 to trap the ends in the blocks 5. The chain 1 can then be tensioned and/or serviced since it is very solidly anchored in the conveyor 4, 14.

We claim:

1. In combination with a scraper conveyor comprising:

a channel having a pair of parallel and longitudinally extending upstanding sides; and a chain extending longitudinally along the channel between the sides thereof and normally advanced therein in a travel direction, a chain-arresting system comprising:

a crosspiece fixable to the chain and having outer ends juxtaposed with the channel sides and each of a predetermined length measured in the direction;

respective blocks fittable with the sides of the channel and each formed with an inwardly open inner groove into which the respective end of the crosspiece can engage, an abutment in the groove having a rear face directed backward against the direction and engageable with the respective crosspiece end, and an inner hole spaced in the direction rearward of the abutment face by a distance greater than the crosspiece-end length; and respective pins engageable through the inner holes behind the respective crosspiece ends to trap same in the respective blocks.

2. The chain-arresting system defined in claim 1 wherein the inner hole traverses the inner groove.

3. The chain-arresting system defined in claim 1 wherein each crosspiece end is formed with a rearwardly directed notch that engages around the respective inner pin.

4. The chain-arresting system defined in claim 1 wherein the crosspiece ends are each of generally trapezoidal section and the inner grooves are complementarily shaped.

5. The chain-arresting system defined in claim 1 wherein the channel sides are formed with vertical channel holes and the blocks are formed with respective outer holes alignable with the channel holes, the system further comprising:

outer bolts engageable through the outer holes and channel holes for fixing the blocks on the channel sides.

6. The chain-arresting system defined in claim 1 wherein each channel side has an inwardly projecting lip and each block is formed with an outer groove engageable over the respective lip.

* * * * *